United States Patent
Alfieri

(10) Patent No.: US 9,323,502 B2
(45) Date of Patent: Apr. 26, 2016

(54) SYSTEM, METHOD, AND COMPUTER PROGRAM PRODUCT FOR ALTERING A LINE OF CODE

(71) Applicant: NVIDIA Corporation, Santa Clara, CA (US)

(72) Inventor: Robert Anthony Alfieri, Chapel Hill, NC (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 13/844,477

(22) Filed: Mar. 15, 2013

(65) Prior Publication Data

US 2014/0282382 A1    Sep. 18, 2014

(51) Int. Cl.
*G06F 9/44* (2006.01)
*G06F 9/45* (2006.01)

(52) U.S. Cl.
CPC ........................................ *G06F 8/33* (2013.01)

(58) Field of Classification Search
None
See application file for complete search history.

(56) References Cited

U.S. PATENT DOCUMENTS

| | | | |
|---|---|---|---|
| 5,774,726 A | 6/1998 | Ahmed | |
| 5,991,771 A | 11/1999 | Falls et al. | |
| 6,044,394 A * | 3/2000 | Cadden et al. | 718/107 |
| 6,106,575 A * | 8/2000 | Hardwick | 717/119 |
| 6,110,218 A | 8/2000 | Jennings | |
| 6,151,618 A * | 11/2000 | Wahbe et al. | 718/1 |
| 6,192,365 B1 | 2/2001 | Draper et al. | |
| 6,344,852 B1 | 2/2002 | Zhu et al. | |
| 6,360,191 B1 | 3/2002 | Koza et al. | |
| 6,393,386 B1 | 5/2002 | Zager et al. | |
| 6,421,808 B1 | 7/2002 | McGeer et al. | |
| 6,452,603 B1 | 9/2002 | Dignam | |
| 6,611,952 B1 | 8/2003 | Prakash et al. | |
| 6,625,797 B1 | 9/2003 | Edwards et al. | |
| 6,691,301 B2 | 2/2004 | Bowen | |
| 6,745,384 B1 * | 6/2004 | Biggerstaff | 717/156 |
| 6,836,877 B1 | 12/2004 | Dupenloup | |
| 6,876,362 B1 | 4/2005 | Newhall, Jr. et al. | |
| 6,990,438 B1 | 1/2006 | Chowdhury et al. | |
| 7,007,261 B1 * | 2/2006 | Ballagh et al. | 716/103 |
| 7,024,660 B2 | 4/2006 | Andrade et al. | |
| 7,058,562 B2 | 6/2006 | Powell | |
| 7,143,387 B2 | 11/2006 | Fields, Jr. et al. | |
| 7,159,183 B1 | 1/2007 | Kudukoli et al. | |
| 7,181,714 B2 | 2/2007 | Imai | |
| 7,240,335 B2 | 7/2007 | Angel et al. | |
| 7,313,773 B1 | 12/2007 | Braun et al. | |
| 7,343,594 B1 | 3/2008 | Metzgen | |

(Continued)

OTHER PUBLICATIONS

De Rauglaudre, "Camlp4—Tutorial" Sep. 2003, accessed online at http://caml.inria.fr archived Feb. 4, 2012 at <https://web.archive.org/web/20120204033453/http://caml.inria.fr/pub/docs/tutorial-camlp4/index.html>.*

(Continued)

*Primary Examiner* — James D Rutten
(74) *Attorney, Agent, or Firm* — Zilka-Kotab, PC

(57) ABSTRACT

A system, method, and computer program product are provided for altering a line of code. In use, a line of code is identified, where the line of code is written utilizing both a programming language and one or more syntax extensions to the programming language. Additionally, the line of code is altered so that the altered line of code is written using only the programming language. Further, the altered line of code is returned.

19 Claims, 4 Drawing Sheets

(56) References Cited

U.S. PATENT DOCUMENTS

| | | | |
|---|---|---|---|
| 7,363,610 B2 | 4/2008 | Alfieri | |
| 7,366,878 B1 | 4/2008 | Mills et al. | |
| 7,383,529 B2 | 6/2008 | Gupta et al. | |
| 7,395,358 B2 | 7/2008 | Mills et al. | |
| 7,433,813 B1 | 10/2008 | Ballagh et al. | |
| 7,472,055 B2 | 12/2008 | Garcia et al. | |
| 7,483,823 B2 | 1/2009 | Alfieri | |
| 7,577,707 B2 | 8/2009 | Hufferd et al. | |
| 7,581,201 B2 | 8/2009 | Kazda et al. | |
| 7,743,370 B1 | 6/2010 | Krablin et al. | |
| 7,802,147 B1 | 9/2010 | Johnson et al. | |
| 7,827,510 B1 | 11/2010 | Schubert et al. | |
| 8,117,574 B2 | 2/2012 | Deutschle et al. | |
| 8,141,059 B2 | 3/2012 | Ding et al. | |
| 8,180,943 B1 | 5/2012 | Priem | |
| 8,219,974 B2 | 7/2012 | Schmidt | |
| 8,458,630 B1 | 6/2013 | Van Canpenhout | |
| 8,463,589 B2 | 6/2013 | Clark et al. | |
| 8,464,217 B2 | 6/2013 | Janczewski | |
| 8,468,335 B2 | 6/2013 | Lin et al. | |
| 8,473,897 B2 | 6/2013 | Box et al. | |
| 8,558,839 B1 | 10/2013 | Wyatt | |
| 8,561,176 B1 | 10/2013 | Dalcher | |
| 8,648,856 B2 | 2/2014 | Newhall, Jr. et al. | |
| 8,776,030 B2 | 7/2014 | Grover et al. | |
| 8,839,163 B2 | 9/2014 | Ootsubo | |
| 8,930,861 B2 | 1/2015 | Alfieri | |
| 9,015,643 B2 | 4/2015 | Alfieri | |
| 9,015,646 B2 | 4/2015 | Alfieri | |
| 9,021,408 B2 | 4/2015 | Alfieri | |
| 9,171,115 B2 | 10/2015 | Alfieri | |
| 2001/0034876 A1 | 10/2001 | Panchul et al. | |
| 2002/0019969 A1 | 2/2002 | Hellestrand et al. | |
| 2002/0133369 A1* | 9/2002 | Johnson | 705/1 |
| 2003/0041248 A1 | 2/2003 | Weber et al. | |
| 2003/0121010 A1 | 6/2003 | Aubury | |
| 2004/0031015 A1* | 2/2004 | Ben-Romdhane | G06F 8/75 717/107 |
| 2004/0068640 A1 | 4/2004 | Jacobson et al. | |
| 2004/0225999 A1* | 11/2004 | Nuss | 717/114 |
| 2004/0226006 A1 | 11/2004 | Russell | |
| 2004/0232942 A1 | 11/2004 | Kundu et al. | |
| 2005/0050509 A1 | 3/2005 | Fields et al. | |
| 2005/0144581 A1 | 6/2005 | Imai | |
| 2005/0166033 A1 | 7/2005 | Jacob | |
| 2006/0041872 A1 | 2/2006 | Poznanovic et al. | |
| 2006/0064655 A1 | 3/2006 | Horeth | |
| 2006/0236226 A1* | 10/2006 | Meijer et al. | 715/513 |
| 2007/0055966 A1 | 3/2007 | Waddington et al. | |
| 2007/0168894 A1 | 7/2007 | Iwashita | |
| 2007/0219771 A1 | 9/2007 | Verheyen et al. | |
| 2007/0294647 A1 | 12/2007 | Fong et al. | |
| 2008/0010389 A1* | 1/2008 | Iwata | G06F 13/385 710/29 |
| 2008/0270438 A1* | 10/2008 | Aronson et al. | 707/101 |
| 2009/0204796 A1 | 8/2009 | Mullen et al. | |
| 2009/0241074 A1 | 9/2009 | Tanimoto | |
| 2010/0088666 A1 | 4/2010 | Box et al. | |
| 2010/0268979 A1* | 10/2010 | Johnson | 714/2 |
| 2012/0151437 A1* | 6/2012 | Kneisel | G06F 8/31 717/114 |
| 2012/0311411 A1* | 12/2012 | Kirkpatrick | 714/807 |
| 2012/0324408 A1 | 12/2012 | Shacham et al. | |
| 2013/0014095 A1 | 1/2013 | Metzgen | |
| 2013/0019216 A1 | 1/2013 | Vasudevan et al. | |
| 2014/0278328 A1 | 9/2014 | Alfieri | |
| 2014/0280412 A1 | 9/2014 | Alfieri | |
| 2014/0282309 A1 | 9/2014 | Alfieri | |
| 2014/0282313 A1 | 9/2014 | Alfieri | |
| 2014/0282382 A1 | 9/2014 | Alfieri | |
| 2014/0282390 A1 | 9/2014 | Alfieri | |
| 2014/0310664 A1 | 10/2014 | Alfieri | |
| 2014/0310665 A1 | 10/2014 | Alfieri | |
| 2014/0310673 A1 | 10/2014 | Alfieri | |

OTHER PUBLICATIONS

Horstmann, "Java for Everyone: Compatible with Java 5, 6, and 7" Dec. 20, 2011, John Wiley & Sons, 2nd Edition, p. 41.*
U.S. Appl. No. 13/844,330, filed Mar. 15, 2013.
U.S. Appl. No. 13/868,954, filed Apr. 23, 2013.
U.S. Appl. No. 13/844,374, filed Mar. 15, 2013.
U.S. Appl. No. 13/844,437, filed Mar. 15, 2013.
U.S. Appl. No. 13/844,400, filed Mar. 15, 2013.
U.S. Appl. No. 13/860,463, filed Apr. 10, 2013.
U.S. Appl. No. 13/860,472, filed Apr. 10, 2013.
U.S. Appl. No. 13/860,480, filed Apr. 10, 2013.
Non-Final Office Action from U.S. Appl. No. 13/868,954, dated May 13, 2014.
Final Office Action from U.S. Appl. No. 13/844,437, dated Jul. 15, 2014.
Non-Final Office Action from U.S. Appl. No. 13/844,437, dated Jan. 27, 2014.
Non-Final Office Action from U.S. Appl. No. 13/860,463, dated Feb. 27, 2014.
Non-Final Office Action from U.S. Appl. No. 13/860,480, dated May 13, 2014.
Notice of Allowance from U.S. Appl. No. 13/860,472, dated May 21, 2014.
Final Office Action from U.S. Appl. No. 13/844,374, dated Jul. 8, 2015.
Notice of Allowance from U.S. Appl. No. 13/860,480, dated Jun. 22, 2015.
Non-Final Office Action from U.S. Appl. No. 13/844,330, dated Sep. 17, 2015.
Non-Final Office Action from U.S. Appl. No. 13/844,400, dated Apr. 30, 2015.
Non-Final Office Action from U.S. Appl. No. 13/860,480, dated Mar. 6, 2015.
Notice of Allowance from U.S. Appl. No. 13/844,437, dated Feb. 27, 2015.
Notice of Allowance from U.S. Appl. No. 13/868,954, dated Aug. 22, 2014.
Non-Final Office Action from U.S. Appl. No. 13/844,374, dated Nov. 19, 2014.
Notice of Allowance from U.S. Appl. No. 13/844,437, dated Oct. 21, 2014.
Notice of Allowance from U.S. Appl. No. 13/860,463, dated Jan. 27, 2015.
Notice of Allowance from U.S. Appl. No. 13/860,463, dated Aug. 26, 2014.
Notice of Allowance from U.S. Appl. No. 13/860,472, dated Jan. 15, 2015.
Notice of Allowance from U.S. Appl. No. 13/860,472, dated Sep. 4, 2014.
Final Office Action from U.S. Appl. No. 13/860,480, dated Aug. 21, 2014.
Advisory Action from U.S. Appl. No. 13/844,374, dated Sep. 30, 2015.
Final Office Action from U.S. Appl. No. 13/844,400, dated Oct. 26, 2015.
Final Rejection from U.S. Appl. No. 13/844,330, dated Feb. 11, 2016.

* cited by examiner

SYSTEM, METHOD, AND COMPUTER PROGRAM PRODUCT FOR ALTERING A LINE OF CODE

FIELD OF THE INVENTION

The present invention relates to hardware designs, and more particularly to parsing language associated with a hardware design.

BACKGROUND

Hardware design and verification are important aspects of the hardware creation process. For example, a hardware description language may be used to model and verify circuit designs. However, current techniques for designing hardware have been associated with various limitations.

For example, current hardware design procedures may be only object-oriented. Additionally, the hardware description language may be implemented in a self-contained environment. As a result, creating a hardware design may be confusing and error-prone. There is thus a need for addressing these and/or other issues associated with the prior art.

SUMMARY

A system, method, and computer program product are provided for altering a line of code. In use, a line of code is identified, where the line of code is written utilizing both a programming language and one or more syntax extensions to the programming language. Additionally, the line of code is altered so that the altered line of code is written using only the programming language. Further, the altered line of code is returned.

DETAILED DESCRIPTION

Figure 1:
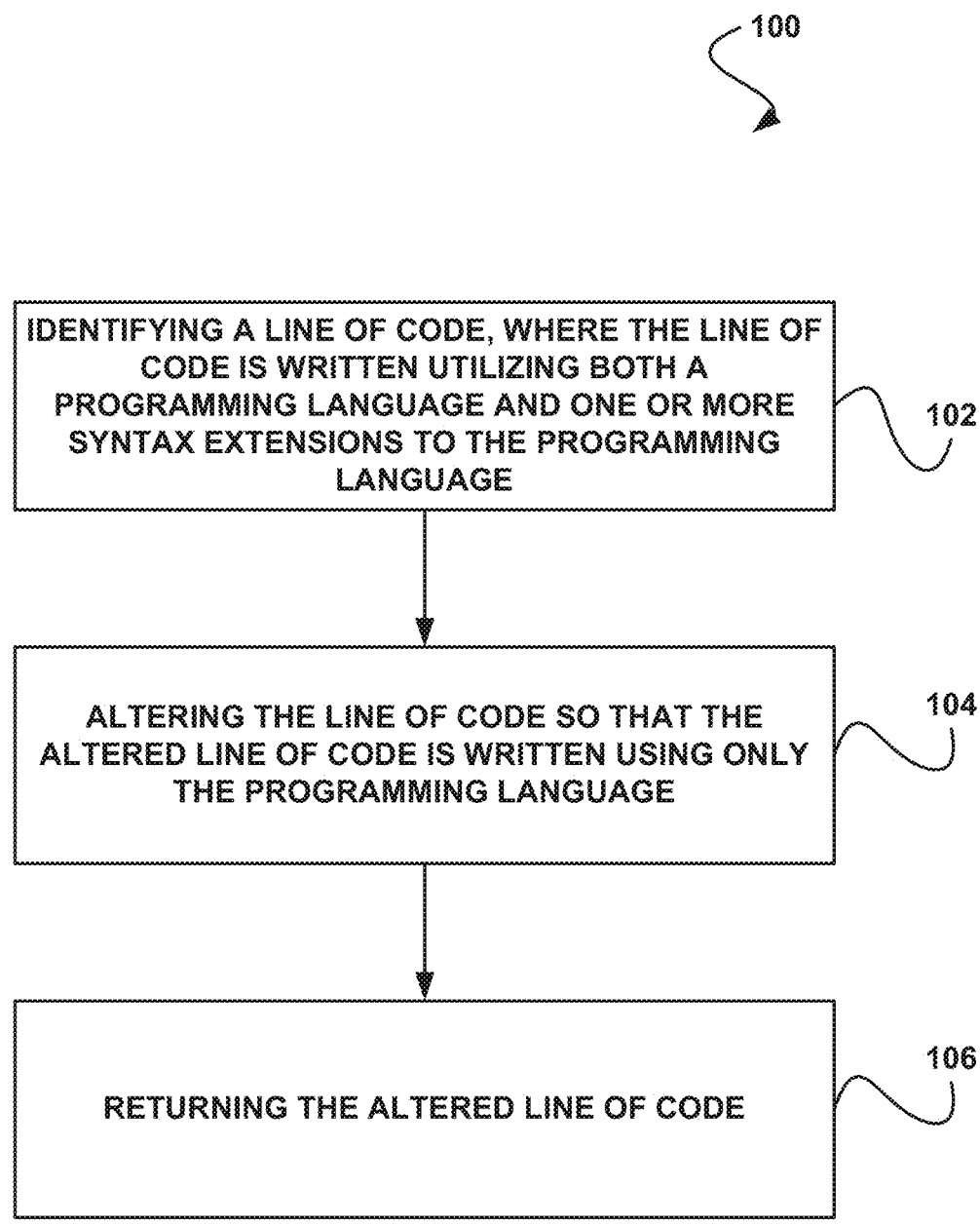
FIG. 1 shows a method for altering a line of code, in accordance with one embodiment.

FIG. 1 shows a method 100 for altering a line of code, in accordance with one embodiment. As shown in operation 102, a line of code is identified, where the line of code is written utilizing both a programming language and one or more syntax extensions to the programming language. In one embodiment, the line of code may be included within a file. For example the line of code may be one of a plurality of lines of code within a source file. In another embodiment, the line of code may be drafted by a user. For example, the user may draft the line of code as part of the source file. In yet another embodiment, the line of code may be part of a hardware design (e.g., a circuit design, etc.).

Additionally, in one embodiment, the programming language may include any software language used to communicate instructions to the parser. For example, the programming language may include a compiled language such as Java®, etc. In another example, the programming language may include a scripting language such as Python™, Perl, etc. In another embodiment, the one or more syntax extensions to the programming language may include syntax not used in or supported by the programming language that is associated with a hardware language. For example, the one or more syntax extensions may include syntax that is recognized and used within a hardware description language (e.g., Verilog®, a custom hardware language (e.g., a data flow-based hardware description language, etc.), etc.), and which is not recognized by a parser of the programming language.

Further, in one embodiment, the one or more syntax extensions may include one or more operators (e.g., syntax that indicates one or more operations to be performed on one or more operands, etc.). In another embodiment, the one or more syntax extensions may include one or more statements (e.g., syntax having one or more expressions to be executed within the line of code, etc.).

Further still, in one embodiment, the line of code may be sent by the user to be parsed. For example, the line of code may be included within a source file that is sent by the user to be parsed. In another embodiment, parsing the line of code may include one or more of compiling the code, interpreting the code, etc. In yet another embodiment, the line of code may be identified by a preparser before the line of code is received by the parser. For example, the preparser may include a module separate from the parser to which a source file containing the line of code is passed before the source file is viewed by the parser.

Also, in one embodiment, the preparser may be created and initiated within an environment of the programming language. For example, the preparser may be loaded and registered within the programming language environment. In another example, the preparser may be loaded and registered as a source filter of the programming language. In another embodiment, the preparser may be passed the source file including the line of code and the preparser may parse the source file using one or more parsing techniques (e.g., recursive descent, etc.). In yet another embodiment, the line of code may be identified during this parsing.

In addition, as shown in operation 104, the line of code is altered so that the altered line of code is written using only the programming language. In one embodiment, altering the line of code may include converting the one or more syntax extensions in the line of code to a syntax used in and supported by the programming language. In another embodiment, the line of code may be altered, utilizing an operator table. For example, the operator table may store a list of all operators included within the one or more syntax extensions (e.g., as a superset of the programming language, etc.). In another example, the operator table may include a precedence and associativity associated with each operator in the table. In this way, the precedence and associativity in the operator table may dictate an order in which one or more of the syntax extensions (e.g., the operators) are parsed. In yet another example, one or more new operators may be added to the operator table (e.g., by the user, etc.).

Furthermore, in one embodiment, altering the line of code may include changing a hardware description language operator in the line of code that is not supported by the programming language. For example, the hardware description language operator that is not supported by the programming language may be converted into an operator that is supported by the programming language (e.g., an operator used within the programming language, etc.).

Further still, in one embodiment, altering the line of code may include changing the hardware description language operator to a method call. For example, the hardware description language operator may be changed to an object class method call. In another example, the object class may be created within the programming language, such that the object class and the method call are supported by the programming language. In another embodiment, the object class method call may overload an operator (e.g., using an operator overload table, etc.).

Additionally, in one embodiment, a subroutine may be declared and extended outside of the object class. For example, a subroutine (e.g., a construct, a hardware code function, etc.) may be extended outside of an object class such that the subroutine is treated as part of the object class. In another embodiment, the object class may represent a data flow. For example, the data flow (input or output) may represent a flow of data. For instance, the data flow may represent a flow of data through a hardware design. In another embodiment, the data flow may include one or more groups of signals. For example, the data flow may include one or more groups of signals including implicit flow control signals that may operate according to the interface protocol. In yet another embodiment, the data flow may be associated with one or more interfaces. For example, the data flow may be associated with one or more interfaces of a hardware design corresponding to at least one of the received parameters.

Also, in one embodiment, altering the line of code may include speculatively converting an operator in the line of code to a method call. For example, the operator in the line of code may be speculatively converted to a method call by converting the operator to code inside a block that dynamically checks the type of the operand at run time and conditionally converts the operand to a method call, based on the type of the operand at run time.

Additionally, in one embodiment, altering the line of code may include changing a hardware description language statement in the line of code that is not supported by the programming language. For example, the hardware description language statement that is not supported by the programming language may be converted into a statement that is supported by the programming language (e.g., a statement used within the programming language, etc.).

Further, in one embodiment, altering the line of code may include changing the hardware description language statement to a method call. For example, the hardware description language statement may be changed to an object class method call. In another embodiment, altering the line of code may include changing a named hardware description language argument or field to an argument or field supported by the programming language.

Further still, in one embodiment, no additional text lines of code may be created during the altering of the line of code. For example, the altering of the single line of code may result in a single line of code. In this way, a line number associated with the identified line of code may match a line number associated with the altered line of code. In another embodiment, the line of code may be altered by the preparser.

Also, as shown in operation 106, the altered line of code is returned. In one embodiment, the preparser may return the altered line of code to a parser. For example, the preparser may rewrite one or more lines of code within a source file to create a rewritten source file, such that no syntax extensions to the programming language exist in the rewritten source file. In another embodiment, the preparser may then send the rewritten source file to the parser to be parsed.

In this way, syntax extensions may be embedded into the programming language, where such syntax extensions may allow a data flow-based code development approach and may minimize an object-oriented code development approach. Additionally, rules-based programming may be avoided.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
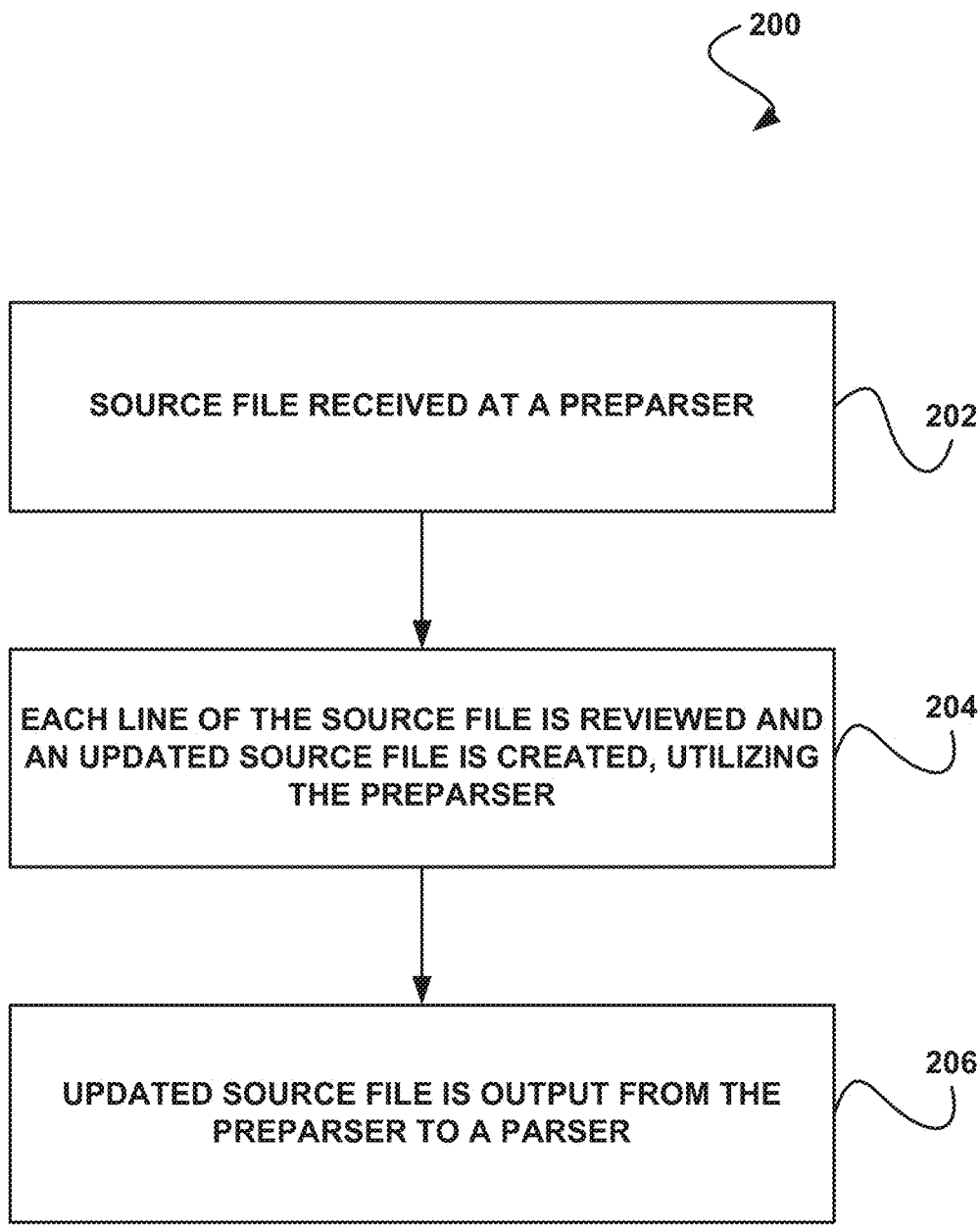
FIG. 2 shows a method for parsing a source file utilizing a preparser.

FIG. 2 shows a method 200 for parsing a source file utilizing a preparser, in accordance with one embodiment. As an option, the method 200 may be carried out in the context of the functionality of FIG. 1. Of course, however, the method 200 may be implemented in any desired environment. It should also be noted that the aforementioned definitions may apply during the present description.

As shown in operation 202, a source file is received at a preparser. In one embodiment, the source file may include a hardware design. For example, the source file may include a hardware circuit design. In another embodiment, the source file may include a plurality of lines (e.g., lines of code, etc.). In yet another embodiment, the source file may be drafted utilizing a plurality of different languages (e.g., description languages, etc.). For example, the source file may include one or more scripting language operators and statements as well as one or more hardware description language operators and statements. See, for example, U.S. patent application Ser. No. 13/844,374, filed Mar. 15, 2013, which is hereby incorporated by reference in its entirety, and which describes examples of hardware description language operators and statements.

Additionally, in one embodiment, the source file may include one or more hardware description operators and statements (e.g., Verilog® operators and statements, custom hardware description operators and statements, etc.). In another embodiment, the source file may include one or more hardware-time statements (e.g., statements made in a custom hardware description language, etc.). In this way, the hardware description operators and statements may comprise syntax extensions to the scripting language used within the source file.

Further, in one embodiment, the source file may be received at the preparser after the initiation of the preparser. For example, the source file may be received at the preparser after the preparser is first loaded and registered as a source filter. In another example, the preparser may be loaded and registered in response to a command (e.g., a user command, etc.). Of course, the preparser may be initiated in any manner.

Further still, as shown in operation 204, each line of the source file is reviewed and an updated source file is created, utilizing the preparser. In one embodiment, the preparser may replace each line of the source file with an updated line in the updated source file. In another embodiment, the preparser may convert the syntax extensions of the scripting language that are found within the source file into instructions supported by the scripting language. For example, the preparser may convert hardware description language operators and statements to scripting language operators and statements.

Also, in one embodiment, the preparser may convert the syntax extensions to the scripting language into one or more method calls. For example, an object class representing a flow of data (e.g., an aFlow class, etc.) may be created utilizing the scripting language. In another example, all types of data flows, whether they are leaf unsigned integers, constants, hierarchical data flows, state variables, inputs, or outputs, may follow the same conventions for construction and manipulation. In another embodiment, the preparser may convert one or more syntax extensions in the source file to one or more method calls within the object class representing the flow of data.

Table 1 illustrates exemplary aFlow class constructors and shorthands for creating new, inactive data flows, in accordance with one embodiment. Of course, it should be noted that the exemplary implementation shown in Table 1 is set forth for illustrative purposes only, and thus should not be construed as limiting in any manner.

TABLE 1 aFlow->Uint(20) may return a flow that has no name but is 20 bits wide. This may be called a leaf flow. A leaf may be 0 bits wide and may consume no area. Its value may always be 0.
aFlow->Const(20) may returns an aFlow that is wide enough to hold the value 20 (i.e., 5 bits) and records the constant value 20. Note that the value 0 may consume 0 bits.
aFlow->Hier( ) may take a list of name => value pairs for the initial set of fields for the hierarchy flow. If the value is an integer (e.g., 20, 40, 60 above) then that value may denote a leaf flow of that bitwidth with the name pointing to that leaf. If the value is a Verilog ® literal, then that field is a constant leaf. Flows and FIFO space may not be allowed for parts of flows that are constants.
aFlow->Hier( ) may allow nested data structures, such as aFlow->Hier(a => 20, b => [c => 40, d => 80], e => 8'h1f), which means that a is a leaf flow, but b is a hierarchy flow with leaf flows c and d. In another embodiment, e may be a constant flow of given width and value. These shorthands may translate into various aFlow constructor calls.
$Flow->Clone( ) may be used to clone an existing flow $Flow, even if it's an active flow. The result may be inactive.
$Flow->Clone( ) may clone the existing flow but may convert all constant leaves into normal Uint( ) leaves of the same width.

In one embodiment, as a shorthand, the preparser may allow the full set of Verilog® literals such as 32'hbabecafe. The preparser may convert these to aFlow→Const("32'hbabecafe") calls before the scripting language sees them. Because 'hdeadbeef syntax would confuse the preparser (single quote begins a character string in some languages), it may be required that the user use 0'hdeadbeef to indicate that the width of the literal should be calculated, which is 32 in this case.

Additionally, in one embodiment, a named hierarchy with N names with the same prefix may be created. Table 2 illustrates exemplary Hier_Named_N( ) constructor for creating a named hierarchy with N names with the same prefix, in accordance with one embodiment. Of course, it should be noted that the exemplary implementation shown in Table 2 is set forth for illustrative purposes only, and thus should not be construed as limiting in any manner.

TABLE 2 my $Flow = aFlow
   ->Hier_Named_N( "prefix", 4, [a => 12, b => 3] )
     ->Defer_Output( );
$Flow->print( "Flow" );
Flow => (iflow)
  prefix0 =>
    a => 12
    b => 3
  prefix1 =>
    a => 12
    b => 3
  prefix2 =>
    a => 12
    b => 3
  prefix3 =>
    a => 12
    b => 3

Also, in one embodiment, in order to facilitate the creation of numerical hierarchy data flows where each subflow contains the same structure, the aFlow→Hier_N(10, name=>subflow, etc.) syntax may be used. aFlow→Hier_N( ) takes the number of subflows followed by the same type of arguments one would pass to aFlow→Hier( ). In another embodiment, once a data flow is constructed using one of those constructors, it may appear thereafter as a hash (e.g., an anonymous hash in Perl, etc.). A user may then use normal built-in hash operations to access and change the data flow or one of its subflows. The aFlow class may implement this by overriding the hash operators in the scripting language (e.g., in Perl, this is called a "tied hash").

In addition, in one embodiment, the preparser may parse the entire scripting language. For example, the preparser may use a recursive-descent parser structure to parse the entire scripting language. In another embodiment, the preparser may convert the syntax extensions into one or more method calls, utilizing a table. For example, a table may store each of the syntax extensions in association with values indicating a precedence and associativity of each extension. The information in this table may instruct the preparser an order in which the syntax extensions are to be parsed. In yet another embodiment, a precedence and associativity associated with the scripting language itself, as well as the hardware description language, may not be altered, such that a parsing order may be clear to a developer or other user.

Table 3 illustrates exemplary preparser conversions from syntax extensions into method calls, in accordance with one embodiment. Of course, it should be noted that the exemplary implementation shown in Table 3 is set forth for illustrative purposes only, and thus should not be construed as limiting in any manner.

TABLE 3 unary method call for a "|" syntax extension operator:
aFlow->_op_unary( "|", $Opnd0 )
binary method call for a "<<<" syntax extension operator:
aFlow->_op_binary( "<<<", $Opnd0, $Opnd1 )
ternary method call for a "?:" syntax extension operator:
aFlow->_op_ternary( "?:", $Opnd0, $Opnd1, $Opnd2 )
Nary method call for a "xxx" syntax extension operator:
aFlow->_op_nary( "xxx", <operands> )

Further, in one embodiment, one or more changes may be made to operators within the source file in order to avoid conflicts with the scripting language. For example, to avoid conflicts with Perl { } and [ ] operators, a Verilog® concatenation operator may be changed to {< . . . >}. Additionally, the Verilog® bitslice operator may be changed to $Flow[<$msb:$lsb>]. Further, the Verilog® index operator for indexing into numeric hierarchical data flow may be changed to $Flow[<$i>]. Also, <== may be used instead of <= to avoid conflict with the less-equal-to operator.

Further still, in one embodiment, the preparser may speculatively convert a syntax extension operator in the source file to a method call. For example, Perl may expect operators such as &&, ||, ^, ?:, and, or, etc. to evaluate to a boolean value, so overloading them like "+" may not be sufficient. In another example, the Perl assignment operator = may not be overloaded, the Perl variable name may need to be recorded for the debugger and generated RTL. The preparser may have no idea which Perl variables are normal Perl values, and which are aFlows, so the preparser may speculatively convert an operator to an aFlow call. In this way, the aFlow call may check for the type of the value while a script is running and may evaluate operands only when allowed by the operator.

For example, the preparser may convert the operator into code inside a Perl do { . . . ; expr} block that dynamically checks if the operands are aFlows. If it is determined that the operands are not aFlows, the preparser may do the same operation that Perl would do as if the preparser hadn't converted it. If it determined that the operands are aFlows, the preparser may call into an aFlow method to handle the operator (i.e., record it for generation, etc.).

Also, in one embodiment, the preparser may convert a hardware description language statement in the line of code that is supported by the scripting language. Table 4 illustrates an exemplary preparser conversion of a hardware description language statement to a plurality of aFlow method calls, in accordance with one embodiment. Of course, it should be noted that the exemplary implementation shown in Table 4 is set forth for illustrative purposes only, and thus should not be construed as limiting in any manner.

TABLE 4

Original statement:
If <expr> Then
    <stmts>;
Endif
Converted method calls:
aFlow->_If( <expr> ); aFlow->_Then( );
    <stmts>;
aFlow->_Endif( );

As shown in Table 3, the preprocessor may turn the "If" statement into a function call with the expression, and may then call one or more subroutines. In one embodiment, the aFlow( ) object class may keep a stack of nested blocks (e.g., If, etc.) and may check syntax dynamically. This may allow a Perl if( ) statement, etc. to be put around parts of the If statement shown above, and may avoid syntax errors due to illegal nesting. Additionally, aFlow may keep track of the "lexical" scopes while the design script is actually running rather than trying to resolve them at parse time. In another embodiment, other hardware description language statements may be handled same way (e.g., For, While, Forever, Given, etc.).

Additionally, in one embodiment, the preparser may change a named hardware description language argument or field to an argument or field supported by the scripting language. For example, scripting languages may include built-in primitives and syntaxes for dynamic arrays (lists) and hashes. Arrays implement an ordered (numbered) list of values, but may have no names besides their indexes. Hashes implement sets of named values, but may have no order among the names. Hardware designers may need both naming and order of names.

In order to provide both naming and order of names, hierarchical data flows may be implemented using name=>subflow pairs. In some scripting languages such as Perl, the '=>' operator is really just a comma (or can be preparsed into such), so an array initializer such as [a=>20, b=>30, c=>40] may be equivalent to ["a", 20, "b", 30, "c", 40]. In other words, may be an array of (name, value) pairs. This syntax may provide both non-numeric names as well as ordering of fields.

Further, in one embodiment, Perl Hash name=>val pairs may not be ordered, which may not work for aFlow→Hier( ) where user wants fields to retain order. In response, a list of name=>val pairs may be provided to Hier( ) and similar places, then an aFlow object may record the name order as a list of names. In this way, the order may appear in a data flow layout and in a debugger.

Further still, in one embodiment, language in the source code may be extended outside of the object class. For example, *aFlow::function=sub { . . . } may be used to define a construct or hardware code function in aFlow from somewhere else. Additionally, when Flow→function( ) is called, it may automatically be treated as if the function were part of the aFlow object class.

Also, in one embodiment, one or more additional operators may be registered with the preparser and with the object class. Table 5 illustrates an exemplary function for registering new operators, in accordance with one embodiment. Of course, it should be noted that the exemplary implementation shown in Table 5 is set forth for illustrative purposes only, and thus should not be construed as limiting in any manner.

TABLE 5

Op_Register( "&&!!", "unary", 15, "left", &op_func );

As shown in Table 5, a new operator ("&&!!") is registered, along with its associated precedence (15), associativity (left), and a function to call when the operator is parsed (&op_func). In one embodiment, the new operator may be added to a table storing each of the syntax extensions.

Also, in one embodiment, the preparser may help the aFlow object class record variable names used in the scripting language. For example, the preparser may record every line of the source code and attach them to associated nodes in the source database. This may allow the back-end to include the original scripting code in the generated Verilog® language. It also may be usable in the debugger for a more accurate representation of the source code even though the source code came from a scripting language.

Additionally, as shown in operation 206, the updated source file is output from the preparser to a parser. In one embodiment, the parser may analyze the updated source file according to a plurality of rules. In another embodiment, the parser may parse the updated source file as part of a hardware construction process.

In this way, the preparser may enable the addition of syntax extensions to the underlying scripting language. For example, all the operators provided by a scripting language as well as system Verilog® operators and custom hardware operators may be supported. Additionally, various custom statements such as If, Given, For, While, etc. may be supported. The preparser may run over the source code before the scripting language has a chance to parse it.

Figure 3:
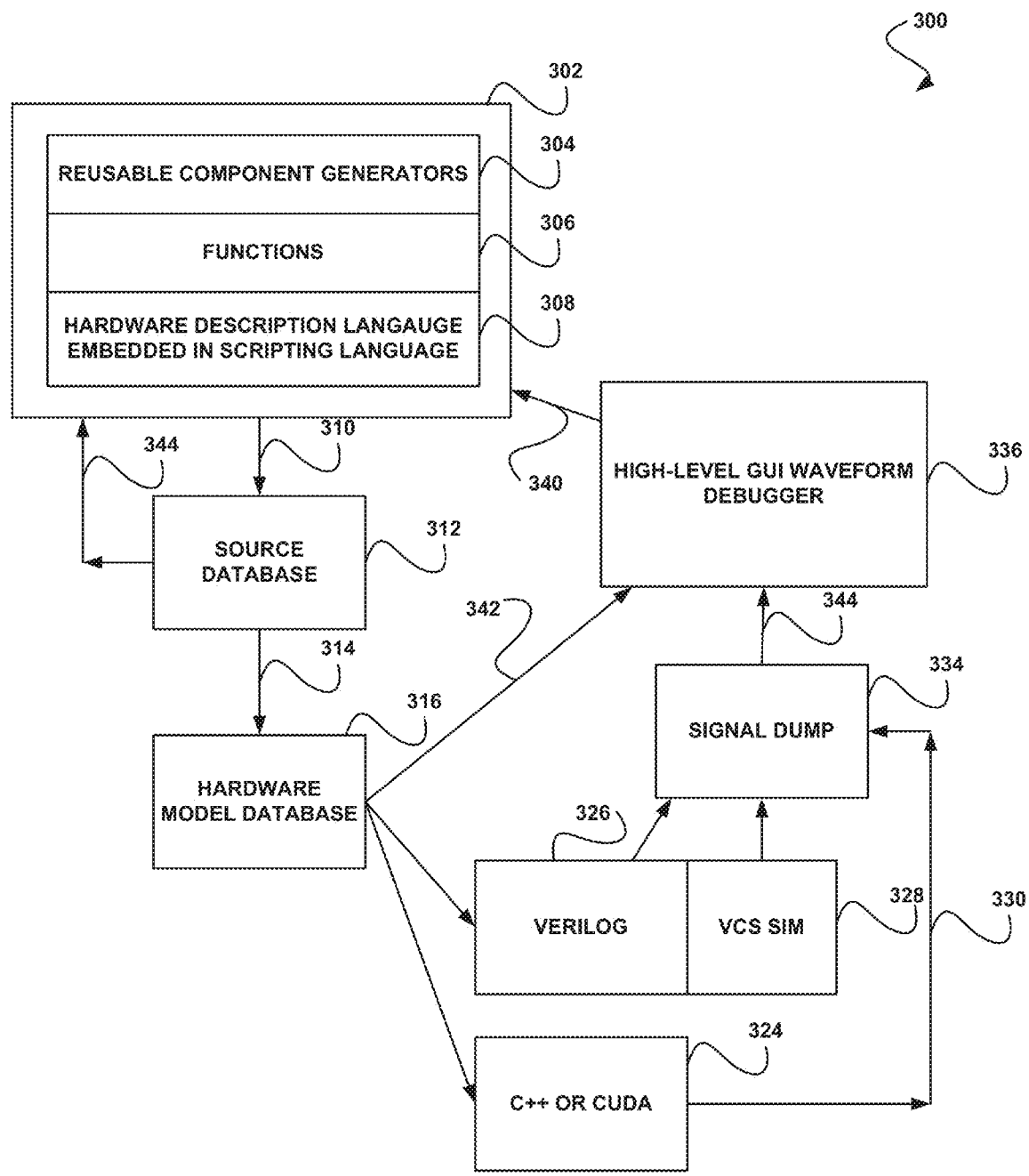
FIG. 3 shows an exemplary hardware design environment, in accordance with one embodiment.

FIG. 3 shows an exemplary hardware design environment 300, in accordance with one embodiment. As an option, the environment 300 may be carried out in the context of the functionality of FIGS. 1-2. Of course, however, the environment 300 may be implemented in any desired environment. It should also be noted that the aforementioned definitions may apply during the present description.

As shown, within a design module 302, reusable component generators 304, functions 306, and a hardware description language embedded in a scripting language 308 are all used to construct a design that is run and stored 310 at a source database 312. Also, any build errors within the design are corrected 344, and the design module 302 is updated. Additionally, the system backend is run on the constructed design 314 as the design is transferred from the source database 312 to a hardware model database 316.

Additionally, the design in the hardware model database 316 is translated into C++ or CUDA™ 324, translated into Verilog® 326, or sent directly to the high level GUI (graphical user interface) waveform debugger 336. If the design is translated into C++ or CUDA™ 324, the translated design 330 is provided to a signal dump 334 and then to a high level debugger 336. If the design is translated into Verilog® 326, the translated design is provided to the signal dump 334 or a VCS simulation 328 is run on the translated design, which is then provided to the signal dump 334 and then to the high level GUI waveform debugger 336. Any logic bugs found using the high level GUI waveform debugger 336 can then be corrected 340 utilizing the design module 302.

Figure 4:
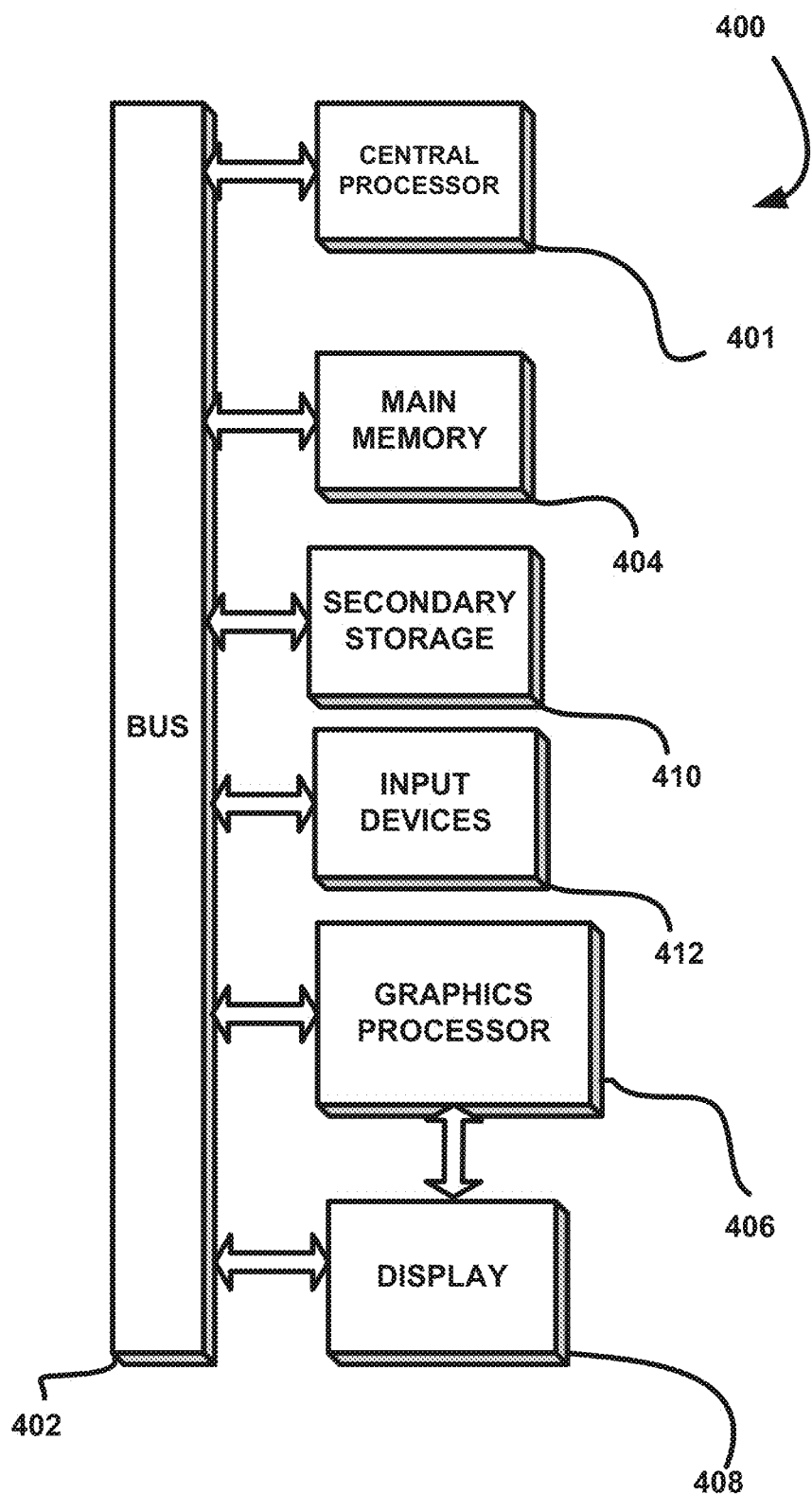
FIG. 4 illustrates an exemplary system in which the various architecture and/or functionality of the various previous embodiments may be implemented.

FIG. 4 illustrates an exemplary system 400 in which the various architecture and/or functionality of the various previous embodiments may be implemented. As shown, a system 400 is provided including at least one host processor 401 which is connected to a communication bus 402. The communication bus 402 may be implemented using any suitable protocol, such as PCI (Peripheral Component Interconnect), PCI-Express, AGP (Accelerated Graphics Port), HyperTransport, or any other bus or point-to-point communication protocol(s). The system 400 also includes a main memory 404. Control logic (software) and data are stored in the main memory 404 which may take the form of random access memory (RAM).

The system 400 also includes input devices 412, a graphics processor 406 and a display 408, i.e. a conventional CRT (cathode ray tube), LCD (liquid crystal display), LED (light emitting diode), plasma display or the like. User input may be received from the input devices 412, e.g., keyboard, mouse, touchpad, microphone, and the like. In one embodiment, the graphics processor 406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user. The system may also be realized by reconfigurable logic which may include (but is not restricted to) field programmable gate arrays (FPGAs).

The system 400 may also include a secondary storage 410. The secondary storage 410 includes, for example, a hard disk drive and/or a removable storage drive, representing a floppy disk drive, a magnetic tape drive, a compact disk drive, digital versatile disk (DVD) drive, recording device, universal serial bus (USB) flash memory, etc. The removable storage drive reads from and/or writes to a removable storage unit in a well-known manner.

Computer programs, or computer control logic algorithms, may be stored in the main memory 404 and/or the secondary storage 410. Such computer programs, when executed, enable the system 400 to perform various functions. Memory 404, storage 410 and/or any other storage are possible examples of computer-readable media.

In one embodiment, the architecture and/or functionality of the various previous figures may be implemented in the context of the host processor 401, graphics processor 406, an integrated circuit (not shown) that is capable of at least a portion of the capabilities of both the host processor 401 and the graphics processor 406, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 400 may take the form of a desktop computer, laptop computer, server, workstation, game consoles, embedded system, and/or any other type of logic. Still yet, the system 400 may take the form of various other devices m including, but not limited to a personal digital assistant (PDA) device, a mobile phone device, a television, etc.

Further, while not shown, the system 400 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
identifying a line of code, by a processor, wherein the line of code is one of a plurality of lines of code within a source file written utilizing both a programming language and one or more syntax extensions to the programming language;
determining, by a processor, that a first operator in the line of code associated with a first syntax extension of the one or more syntax extensions conflicts with a second operator associated with the programming language, wherein the first operator is specific to a hardware description language;
altering the line of code, by the processor, so that the altered line of code is written using a third operator that does not conflict with the second operator;
speculatively converting a fourth operator in a second line of code to a block of code configured to dynamically check if an operand associated with the fourth operator is part of an aFlow class; and
returning the altered line of code.

2. The method of claim 1, wherein the programming language includes a scripting language.

3. The method of claim 1, wherein the one or more syntax extensions to the programming language include syntax associated with the hardware description language that is not used in or supported by the programming language.

4. The method of claim 1, wherein the one or more syntax extensions include syntax that is recognized and used within the hardware description language and is not recognized by a parser of the programming language.

5. The method of claim 1, wherein the line of code may be altered utilizing an operator table that includes a precedence and an associativity associated with each operator in the table.

6. The method of claim 1, wherein altering the line of code includes changing a syntax extension operator in the line of code to a method call supported by the programming language.

7. The method of claim 6, wherein the method call is an object class method call, where the object class represents a group of signals including implicit flow control signals configured to operate according to an interface protocol.

8. The method of claim 1, wherein altering the line of code includes changing a hardware description language statement in the line of code that is not supported by the programming language to a method call supported by the programming language.

9. The method of claim 1, further comprising calling into a method to handle the fourth operator when the operand associated with the fourth operator is part of the aFlow class.

10. The method of claim 1, further comprising performing an operation corresponding to the fourth operator according to the programming language when the operand associated with the fourth operator is not part of the aFlow class.

11. The method of claim 1, further comprising:
recording each line of the source file; and
attaching an associated node in a source database with each recorded line of the source file.

12. A computer program product embodied on a computer readable medium, comprising:
code for identifying a line of code, wherein the line of code is one of a plurality of lines of code within a source file written utilizing both a programming language and one or more syntax extensions to the programming language;
code for determining that a first operator in the line of code associated with a first syntax extension of the one or more syntax extensions conflicts with a second operator associated with the programming language, wherein the first operator is specific to a hardware description language;
code for altering the line of code so that the altered line of code is written using a third operator that does not conflict with the second operator;
speculatively converting a fourth operator in a second line of code to a block of code configured to dynamically check if an operand associated with the fourth operator is part of an aFlow class; and
code for returning the altered line of code.

13. The computer program product of claim 12, further comprising calling into a method to handle the fourth operator when the operand associated with the fourth operator is part of the aFlow class.

14. The computer program product of claim 12, further comprising performing an operation corresponding to the fourth operator according to the programming language when the operand associated with the fourth operator is not part of the aFlow class.

15. The computer program product of claim 12, further comprising:
recording each line of the source file; and
attaching an associated node in a source database with each recorded line of the source file.

16. A system, comprising:
a processor for:
identifying a line of code, wherein the line of code is one of a plurality of lines of code within a source file written utilizing both a programming language and one or more syntax extensions to the programming language;
determining that a first operator in the line of code associated with a first syntax extension of the one or more syntax extensions conflicts with a second operator associated with the programming language, wherein the first operator is specific to a hardware description language;
altering the line of code so that the altered line of code is written using a third operator that does not conflict with the second operator;
speculatively converting a fourth operator in a second line of code to a block of code configured to dynamically check if an operand associated with the fourth operator is part of an aFlow class; and
returning the altered line of code.

17. The system of claim 16, further comprising calling into a method to handle the fourth operator when the operand associated with the fourth operator is part of the aFlow class.

18. The system of claim 16, further comprising performing an operation corresponding to the fourth operator according to the programming language when the operand associated with the fourth operator is not part of the aFlow class.

19. The system of claim 16, further comprising:
recording each line of the source file; and
attaching an associated node in a source database with each recorded line of the source file.

\* \* \* \* \*